(12) United States Patent
Kunz et al.

(10) Patent No.: US 8,998,347 B2
(45) Date of Patent: Apr. 7, 2015

(54) BRAKE SYSTEM FOR A VEHICLE AND METHOD FOR OPERATING A BRAKE SYSTEM OF A VEHICLE

(75) Inventors: Michael Kunz, Steinheim an der Murr (DE); Stefan Strengert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 13/580,851

(22) PCT Filed: Jan. 11, 2011

(86) PCT No.: PCT/EP2011/050256
§ 371 (c)(1),
(2), (4) Date: Nov. 19, 2012

(87) PCT Pub. No.: WO2011/104047
PCT Pub. Date: Sep. 1, 2011

(65) Prior Publication Data
US 2013/0062931 A1    Mar. 14, 2013

(30) Foreign Application Priority Data
Feb. 24, 2010    (DE) .......................... 10 2010 002 272

(51) Int. Cl.
*B60T 8/34* (2006.01)
*B60T 8/48* (2006.01)
*B60T 8/36* (2006.01)
*B60T 8/42* (2006.01)

(52) U.S. Cl.
CPC ............. *B60T 8/4827* (2013.01); *B60T 8/348* (2013.01); *B60T 8/3655* (2013.01); *B60T 8/4275* (2013.01)

(58) Field of Classification Search
CPC ............................. B60T 8/4827; B60T 8/348

USPC .............................................. 303/3, 10, 113.1
See application file for complete search history.

(56) References Cited

U.S. PATENT DOCUMENTS

| 4,395,883 | A | 8/1983 | Melinat |
| 4,828,338 | A | 5/1989 | Ocvirk et al. |
| 5,015,044 | A | 5/1991 | Kircher et al. |
| 6,324,588 | B1 * | 11/2001 | Desruisseaux et al. ........ 719/313 |
| 7,059,691 | B2 * | 6/2006 | Tsunehara et al. ............. 303/152 |
| 2002/0158510 | A1 | 10/2002 | Kobayashi et al. |

(Continued)

FOREIGN PATENT DOCUMENTS

| CN | 101062679 | 10/2007 |
| DE | 33 45 694 | 6/1985 |

(Continued)

*Primary Examiner* — Anna Momper
(74) *Attorney, Agent, or Firm* — Kenyon & Kenyon LLP

(57) ABSTRACT

A brake system and method for operating same for a vehicle having a master brake cylinder, a brake medium reservoir, a first wheel brake cylinder, into which a first brake medium volume is displaceable from the master cylinder, a second wheel brake cylinder, into which a second brake medium volume is displaceable from the master cylinder, and a pump, which is hydraulically connected to the brake medium reservoir, the first wheel brake cylinder being hydraulically connected to the pump via a first non-return valve and the second wheel brake cylinder being hydraulically connected to the pump via a second non-return valve so that the pump can pump a third brake medium volume from the brake medium reservoir through the first non-return valve into the first wheel brake cylinder and a fourth brake medium volume from the brake medium reservoir through the second non-return valve into the second wheel brake cylinder.

15 Claims, 2 Drawing Sheets

(56) References Cited

U.S. PATENT DOCUMENTS

| | | | |
|---|---|---|---|
| 2006/0087173 A1* | 4/2006 | Kajiyama et al. | 303/3 |
| 2006/0152072 A1* | 7/2006 | Baechle et al. | 303/11 |
| 2009/0072615 A1* | 3/2009 | Oosawa et al. | 303/113.1 |

FOREIGN PATENT DOCUMENTS

| | | |
|---|---|---|
| DE | 36 24 344 | 1/1988 |
| DE | 40 09 640 | 6/1991 |
| DE | 40 29 793 | 3/1992 |
| DE | 42 13 740 | 10/1993 |
| DE | 195 34 451 | 3/1997 |
| DE | 198 25 278 | 12/1999 |
| DE | 10 2004 044599 | 4/2005 |
| DE | 10 2005 061543 | 7/2007 |
| DE | 10 2006 046935 | 4/2008 |
| DE | 10 2008 002345 | 12/2009 |
| EP | 1 470 979 | 10/2004 |
| JP | 61-232954 | 10/1986 |
| JP | 62-173364 | 7/1987 |
| JP | 7-502469 | 3/1995 |
| JP | 11-301435 | 11/1999 |
| JP | 2000-354302 | 12/2000 |
| JP | 2005-170287 | 6/2005 |
| JP | 2005-199744 | 7/2005 |
| JP | 2007-216766 | 8/2007 |
| JP | 2007-2710372 | 8/2007 |
| WO | 89/01890 | 3/1989 |
| WO | 93/11009 | 6/1993 |
| WO | WO 94/25322 | 11/1994 |
| WO | WO 2008/058985 | 5/2008 |
| WO | 2009/089944 | 7/2009 |
| WO | WO 2009/149977 | 12/2009 |

* cited by examiner

BRAKE SYSTEM FOR A VEHICLE AND METHOD FOR OPERATING A BRAKE SYSTEM OF A VEHICLE

FIELD OF THE INVENTION

The present invention relates to a brake system for a vehicle. Furthermore, the present invention relates to a method for operating a brake system of a vehicle.

BACKGROUND INFORMATION

Electric and hybrid vehicles have a brake system designed for recuperative braking including an electric motor operated as a generator during recuperative braking. Following an intermediate storage, the electrical energy recovered during recuperative braking may be used for accelerating the vehicle.

This makes it possible to reduce power loss, which a conventional vehicle incurs when braking frequently in travel, energy consumption and pollutant emission of the electric or hybrid vehicle.

However, operating the electric motor, for example the electric drive motor, in generator mode typically requires a certain minimum speed of the vehicle. A recuperative brake system is thus frequently unable to exert a regenerative braking torque on the wheels of the vehicle for as long as it takes for the moving vehicle to come a standstill. For this reason, a hybrid vehicle often has, in addition to the recuperatively operated electric motor, also a hydraulic brake system, which makes it possible, at least in a low speed range, to compensate for the lack of braking action of the recuperative brake. In this case it is possible to apply the entire braking torque via the hydraulic brake system even when the electrical energy store is full, which is when the recuperative brake usually exerts no braking torque on the wheels.

On the other hand, in some situations, it is desirable to exert the lowest possible hydraulic braking force on the wheels in order to achieve a high degree of recuperation. For example, following shifting operations, the decoupled generator is often activated as a recuperative brake in order to ensure reliable charging of the intermediate store and high energy savings.

Generally, a driver may prefer a total braking torque, which corresponds to his actuation of a brake input element such as his brake pedal actuation, for example, irrespective of an activation or deactivation of the recuperative brake. For this reason, some electric and hybrid vehicles have an automatic system, which is supposed to adapt the braking torque of the hydraulic brake system to the current braking torque of the recuperative brake in such a way that a desired total braking torque is maintained. The driver thus does not have to take on the task of the delay regulator himself, by adapting the braking torque of the hydraulic brake systems via an appropriate actuation of the brake input element to the current braking torque of the recuperative brake. Examples for such an automatic system are brake-by-wire brake systems, in particular EHB systems. Due to their complex electronics, mechanics and hydraulics, however, brake-by-wire brake systems are relatively expensive.

As an alternative to brake-by-wire brake systems, DE 10 2008 002 345 A1 discusses a brake system, which includes a first brake circuit decoupled from a master brake cylinder and connected to a brake medium reservoir. This first brake circuit has a wheel axle assigned to it, onto which a recuperative braking torque of an electric motor operated as a generator may be applied. Two additional brake circuits are coupled to the master brake cylinder in such a way that the driver is able to brake into them directly and thus exert a direct hydraulic braking torque onto the wheels associated with the two additional brake circuits.

SUMMARY OF THE INVENTION

The exemplary embodiments and/or exemplary methods of the present invention provide a brake system for a vehicle having the features described herein and a method for operating a brake system of a vehicle having the features described herein.

In the brake system according to the present invention, the driver has the option of braking actively into the first wheel brake cylinder and/or into the second wheel brake cylinder by actuating a brake input element coupled to the master brake cylinder. Additionally, a brake pressure in the first wheel brake cylinder and/or in the second wheel brake cylinder may be actively built up/increased via an actuation of the pump decoupled from/independently of the actuation of the brake input element by the driver. In spite of the common use of the pump for setting a desired brake pressure in the first wheel brake cylinder and/or in the second wheel brake cylinder, an undesired brake medium transfer between the first brake circuit and the second brake circuit is preventable via the first non-return valve and the second non-return valve. In the invention described here, this advantage is realizable in particular at comparatively low costs of the two non-return valves. Thus, it is possible to generate in a cost-effective manner a brake pressure in the first and/or second wheel brake cylinder that is not attributable to an exertion of force on the master brake cylinder.

It should be noted that the brake medium reservoir is not to be understood as the master brake cylinder. Instead, the brake medium reservoir may be understood as a brake medium volume or a brake medium container, the internal pressure of which is settable irrespective of an internal pressure of the master brake cylinder or corresponds to a definitively specified pressure such as atmospheric pressure, for example.

In one advantageous specific embodiment, the first non-return valve is oriented in such a way, that a brake medium displacement from the first wheel brake cylinder to a delivery side of the pump is prevented, and the second non-return valve is oriented in such a way that a brake medium displacement from the second wheel brake cylinder to the delivery side of the pump is prevented. In this case, the two non-return valves and their orientation ensure that a pressure may be increased in each of the two brake circuits with the aid of a pump and, at the same time, an undesired brake medium exchange between the two brake circuits associated with the first and the second wheel brake cylinder is prevented.

In one advantageous further development, the brake system comprises a first continuously adjustable valve, which is coupled to the brake medium reservoir, the first wheel brake cylinder being hydraulically connected to the first continuously adjustable valve in such a way that a fifth brake medium volume is transferable through the at least partially open first continuously adjustable valve from the first wheel brake cylinder into the brake medium reservoir. As an alternative or as a supplement, the brake system may also comprise a second continuously adjustable valve, which is coupled to the brake medium reservoir, the second wheel brake cylinder being hydraulically connected to the second continuously adjustable valve in such a way that a sixth brake medium volume is transferable through the at least partially open second continuously adjustable valve from the second wheel brake cylinder into the brake medium reservoir. The actively built up brake pressure may thus be transferred back. Following an active pressure buildup by the first pump in the first wheel brake cylinder and/or in the second wheel brake cylinder, it is thus possible to transfer the pumped-in brake medium quickly and simply back into the brake medium reservoir.

The first continuously adjustable valve and/or the second continuously adjustable valve also allow for the development of a brake circuit, which is assignable to a wheel of the vehicle, it being possible to dispense with equipping the brake circuit with a main switching valve (high-pressure switching valve). Instead, the function of the omitted main switching valve (high-pressure switching valve) may be performed via the associated continuously adjustable valve, via which the respective brake circuit is coupled to the brake medium reservoir. The provision of the first continuously adjustable valve and/or the second continuously adjustable valve thus allows for the elimination of at least one main switching valve. The total number of electrically controllable/regulatable valves of the brake system thus does not increase in spite of a provision of at least one continuously adjustable valve. This reduces the manufacturing costs for the brake system. Additionally, as is explained in more detailed below, in the case of a reduced number of electrically switchable/controllable valves, it is possible to use a more cost-effective control electronics that is also simpler to manufacture. Moreover, the brake system may be equipped with at least one additional brake circuit, the total number of required/used controllable valves remaining low compared to a conventional design.

The first continuously adjustable valve may be situated in parallel to the first non-return valve and the pump. A parallel arrangement of the first adjustable valve may be understood in such a way that the first continuously adjustable valve is situated in a first line segment between a first junction point and a second junction point, between which a second line segment including the pump and the first non-return valve is situated as well. Accordingly, the second continuously adjustable valve may also be situated in parallel to the second non-return valve and the pump. An example for such an advantageous arrangement of at least one continuously adjustable valve, of the associated non-return valve and of the pump will be discussed in more below.

The first wheel brake cylinder may be connected hydraulically to the master brake cylinder via a block valve in such a way that a displacement of the first brake medium volume from the master brake cylinder into the first wheel brake cylinder is controllable with the aid of the block valve. Thus, at least the first wheel brake cylinder may be decoupled from the master brake cylinder. This expands the possibilities of an active pressure buildup in the first wheel brake cylinder using the pump.

Accordingly, the second wheel brake cylinder may also be hydraulically connected to the master brake cylinder via another block valve. In this case, a displacement of the second brake medium volume from the master brake cylinder into the second wheel brake cylinder may also be controlled using the additional block valve. The second wheel brake cylinder may thus also be decoupled from the master brake cylinder for an expanded active buildup of a brake pressure.

For example, in this case, following a decoupling from the master brake cylinder, the first hydraulic braking torque of the first wheel brake cylinder and/or the second hydraulic braking torque of the second wheel brake cylinder may be actively set so as to mask a generator braking torque varying over time. This creates the possibility of ascertaining with the aid of a sensor and/or by estimation the total braking torque desired by the driver and/or by an automatic control system of the vehicle, and the recuperative braking torque exerted by the recuperative brake. Subsequently, the difference between the exerted braking torques and the desired total braking torque may be ascertained. A first hydraulic braking torque, a second hydraulic braking torque and/or a sum of the hydraulic braking torques corresponding to the ascertained difference may subsequently be actively built up/applied.

This allows for a generator braking torque to be masked, without the driver having to expend additional work. No expensive electronics are required for performing the method steps described in the above paragraph. A sufficient recuperation efficiency may thus be ensured at tenable costs when using the exemplary embodiments and/or exemplary methods of the present invention.

The exemplary embodiments and/or exemplary methods of the present invention thus is intended to provide an easy-to-operate and cost-effective alternative to a conventional brake-by-wire brake system, which is very advantageous in particular for rear-wheel-drive or all-wheel-drive vehicles. However, the exemplary embodiments and/or exemplary methods of the present invention may also be used for front-wheel drive featuring a by-wire front axle. A masking process is ensured in this instance, which has no effects on the braking distance.

However, the exemplary embodiments and/or exemplary methods of the present invention are not limited to an application in an electric or hybrid vehicle. For example, a transversal acceleration-dependent brake-force distribution may also be implemented by the present invention. In the case of a transversal acceleration-dependent brake-force distribution, the brake force at some of the wheels of the vehicle, which may be at the two rear-axle wheels, is apportioned in accordance with a vertical force that occurs when traveling around a curve. In this manner, the frictional coefficient of the wheels, especially the frictional coefficient of the two rear wheels, may be adapted to the transversal acceleration. This permits more stable braking of the vehicle in curves. To ascertain the hydraulic braking torque that is to be set actively via the first brake circuit, a transversal acceleration ascertained by a sensor device may be used.

In addition, the exemplary embodiments and/or exemplary methods of the present invention may be used for dynamic braking in curves. In the case of dynamic curve braking, the braking force at a wheel on the inside of the curve is increased relative to the braking force at a wheel on the outside of the curve. This achieves a more dynamic handling performance.

In addition, the exemplary embodiments and/or exemplary methods of the present invention may also be used for a more advantageous braking when driving in reverse. In particular, by increasing the braking force at the rear axle, a better brake-force distribution is set for driving in reverse. In this context, one also speaks of a reverse brake-force distribution. Most notably, this permits a substantially more stable braking performance in the case of a slow reverse travel on a downgrade.

For example, the block valve may be hydraulically connected via a supply line to the master brake cylinder, a third wheel brake cylinder being hydraulically connected to the master brake cylinder via the supply line in parallel to the block valve. An arrangement of the third wheel brake cylinder in parallel to the block valve may be understood such that the third wheel brake cylinder is coupled to the supply line via a junction point that is situated between the master brake cylinder and the block valve. The driver is thus able to brake actively into the third wheel brake cylinder even following a closure of the block valve.

Accordingly, the additional block valve may also be hydraulically connected to the master brake cylinder via an additional supply line. In this case, a fourth wheel brake cylinder may be hydraulically connected to the master brake cylinder via the additional supply line in parallel to the additional block valve, that is, bypassing the additional block valve.

The brake system may in particular include a generator, by which a first generator braking torque is exertable at least on the wheel associated with the first wheel brake cylinder and/or a second generator braking torque is exertable on a second wheel associated with the second wheel brake cylinder. Since the first hydraulic braking torque of the first wheel brake cylinder and the second hydraulic braking torque of the second wheel brake cylinder may be built up actively, the first generator braking torque and/or the second generator braking torque may be masked advantageously in this case.

Furthermore, the brake system may have exactly eight controllable valves, which are controllable at least into an open state and into a closed state via an electrical signal provided by a control device of the brake system. The limitation of the valves required by the brake system, which are electrically switchable at least into the open state and into the closed state, to the number of eight reduces the requirements and/or the costs for an electronics suited as a control device.

The exemplary embodiments and/or exemplary methods of the present invention provide for a brake system that is usable in a vehicle having an X brake circuit configuration. Thus, in contrast to conventional brake systems, the brake system according to the present invention having an axle that is decoupled/decouplable from the master brake cylinder is not limited to a use in vehicles having an axle-wise brake circuit configuration.

The advantages described in the above paragraphs are also ensured for a vehicle having a corresponding braking system.

The brake system advantageously includes a generator, by which a first generator braking torque is exertable on a first front wheel associated with the first wheel brake cylinder and/or a second generator braking torque is exertable on a second front wheel associated with the second wheel brake cylinder. In this case it is advantageous if the vehicle also comprises an electromechanical brake booster. As will be explained in more detail below, in this case, the comparatively low dynamics of the pump may be compensated by a use of the electromechanical brake booster.

The advantages described above are also realizable using a corresponding method for operating a brake system of a vehicle.

Additional features and advantages of the exemplary embodiments and/or exemplary methods of the present invention are explained below with reference to the figures.

DETAILED DESCRIPTION

Figure 1:
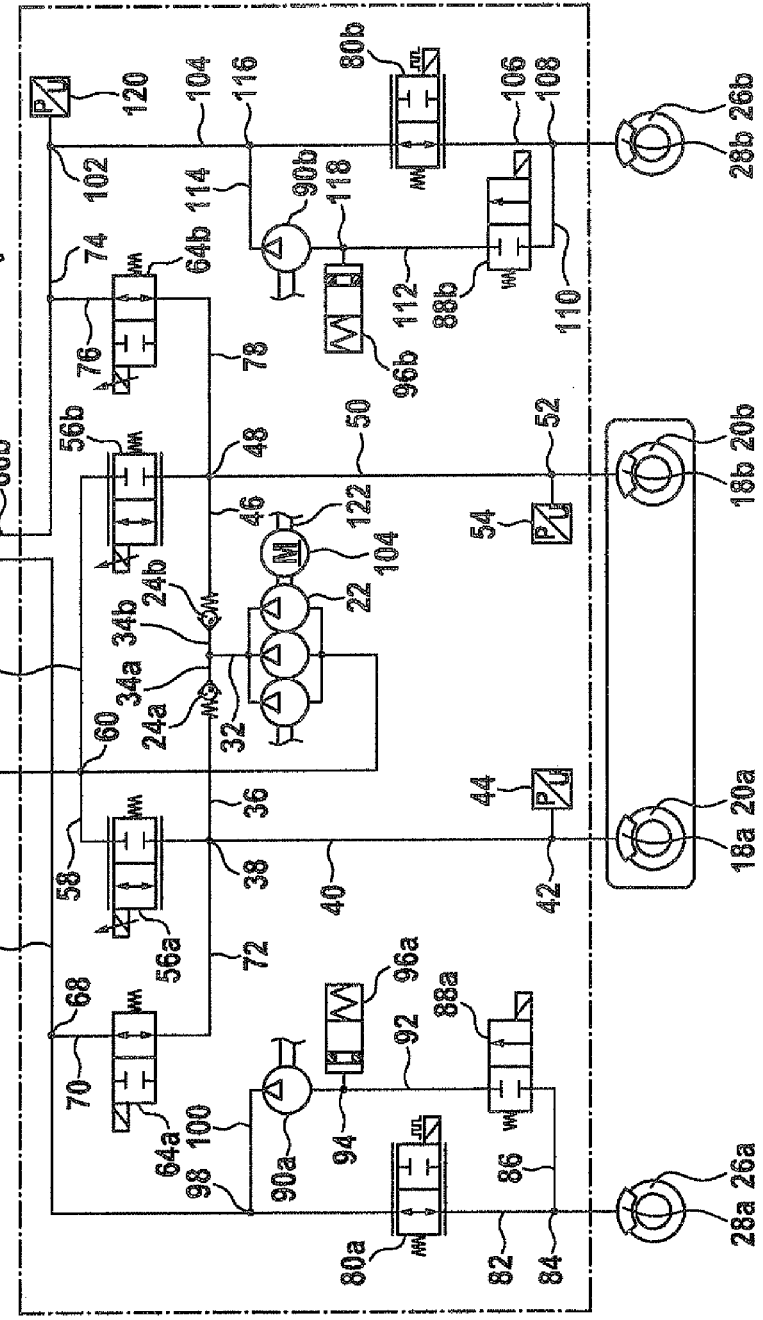
FIG. 1 shows a circuit diagram of a first specific embodiment of the brake system.

FIG. 1 shows a circuit diagram of a first specific embodiment of the brake system. The brake system shown schematically in FIG. 1 is usable not only in an electric or hybrid vehicle. Instead, the brake system may also be used in a vehicle, for example, to ensure a preferred brake force distribution on the wheels of the vehicle when braking during cornering and/or driving in reverse. The indications, described below, of the use of the brake system in an electric or hybrid vehicle are to be understood merely by way of example.

The brake system comprises a master brake cylinder 10 and an additional brake medium reservoir 12. A brake medium exchange bore such as a snifting bore, for example, may be developed between master brake cylinder 10 and brake medium reservoir 12. Master brake cylinder 10 and brake medium reservoir 12, however, may also be developed without a hydraulic connection.

A brake input element 14 such as a brake pedal may be coupled to master brake cylinder 10. As an alternative or a supplement to a brake pedal, a differently developed brake input element 14 may also be used. By actuating brake input element 14, a driver of the vehicle equipped with the brake system is able to effect a pressure increase in an internal volume of master brake cylinder 10. A brake booster 16 may also be coupled to master brake cylinder 10 in such a way that a pressure increase in the interior volume of master brake cylinder 10 may be effected by brake booster 16 as well. Brake booster 16 may be a hydraulic brake booster, in particular an active vacuum booster and/or an electromechanical brake booster, for example. It should be noted, however, that the feasibility of brake booster 16 is not limited to the examples listed here. Any booster device may be used for brake booster 16, for example, which is able to build up a brake pressure in the interior volume of master brake cylinder 10 even without an actuation of brake input element 14 on the part of the driver. Brake booster 16 may be a regulatable/controllable brake booster 16.

Optionally, a sensor (not shown) may also be situated on brake input element 14 in such a way that an actuation of brake input element 14 by the driver is detectable by the sensor. The sensor may be designed to supply a braking force signal and/or braking distance signal, corresponding to the actuation of brake input element 14, to an evaluation electronics/control electronics (not shown). A possibility for using the information provided by the sensor will be explained in more detail below. To be cost-effective, the sensor may be a subunit of brake booster 16. The sensor may also be a pedal-travel sensor, a booster diaphragm-travel sensor and/or a rod-travel sensor. However, the practicability of the sensor is not limited to the examples listed here.

In the brake system, a first wheel brake cylinder 18a and a second wheel brake cylinder 18b are hydraulically connected (independently of each other) to master brake cylinder 10 in such a way that a first brake medium volume, i.e. a first volume of a brake fluid or a brake gas, is displaceable from master brake cylinder 10 into first wheel brake cylinder 18a and a second brake medium volume is displaceable from master brake cylinder 10 into second wheel brake cylinder 18b. The driver thus has the option of braking directly into first wheel brake cylinder 18a and/or into second wheel brake cylinder 18b via an actuation of brake input element 14, and thus to exert a first hydraulic braking torque of first wheel brake cylinder 18a on a first wheel 20a and/or exert a second hydraulic braking torque of second wheel brake cylinder 18b on a second wheel 20b. Accordingly, the first brake medium volume and/or the second brake medium volume may be returned from first wheel brake cylinder 18a or second wheel brake cylinder 18b into master brake cylinder 10 and the built-up hydraulic braking torques reduced.

A first pump 22 of the brake system is hydraulically connected to brake medium reservoir 12. First wheel brake cylinder 18a is hydraulically connected to first pump 22 via a first non-return valve 24a in such a way that, using first pump 22, a third brake medium volume may be pumped from brake medium reservoir 12 through first non-return valve 24a into first wheel-brake cylinder 18a. Accordingly, first pump 22 is hydraulically also connected to second wheel brake cylinder 18*b* via a second non-return valve 24*b*. Using first pump 22, it is thus possible to pump a fourth brake medium volume from brake medium reservoir 12 through second non-return valve 24*b* into second wheel brake cylinder 18*b*. There thus exists the possibility of actively building up or increasing the first hydraulic braking torque of first wheel brake cylinder 18*a* and/or the second hydraulic braking torque of second wheel brake cylinder 18*b* using first pump 22 in a manner that is decoupled from and/or provides a boost to an actuation of brake input element 14 on the part of the driver.

The brake system may include also a third wheel brake cylinder 28*a* associated with a third wheel 26*a* and a fourth wheel brake cylinder 28*b* associated with a fourth wheel 26*b*. Advantageously, third wheel brake cylinder 28*a* and/or fourth wheel brake cylinder 28*b* are also coupled to master brake cylinder 10 in such a way that by a pressure change in the interior volume of master brake cylinder 10 a corresponding pressure change may be effected in third wheel brake cylinder 28*a* and/or in fourth wheel brake cylinder 28*b*. In this case, the driver has the additional option of exerting a third hydraulic braking torque on third wheel 26*a* and/or a fourth hydraulic braking torque on fourth wheel 26*b* via an actuation of brake input element 14. A preferred coupling of third wheel brake cylinder 28*a* and/or fourth wheel brake cylinder 28*b* to master brake cylinder 10 will be discussed in more detail below.

First wheel 20*a* and second wheel 20*b*, or, respectively, third wheel 26*a* and fourth wheel 26*b*, may be situated on a common axle of a vehicle. As will be explained in more detail below, the brake system described here offers vehicle manufacturers great variation options for using wheels 20*a* and 20*b* as front wheels or as rear wheels. The applicability of the brake system described here, however, is not limited to an axle-wise arrangement of wheels 20*a* and 20*b*, or 26*a* and 26*b*, respectively. As an alternative to an axle-wise arrangement, wheels 20*a* and 20*b* may also be arranged on one side of the associated vehicle or diagonally on the vehicle, for example. It should be noted that the illustrated brake system is not limited to the fixed number of four wheels 20*a*, 20*b*, 26*a* and 26*b*. Instead, the brake system may be expanded in such a way that a greater number of wheels are brakable.

In the following, an advantageous specific embodiment of the brake system represented here is described:

In the advantageous specific embodiment, an intake line 30 leads from brake medium reservoir 12 to an intake side of first pump 22. A line 32 coupled to a delivery side of first pump 22 splits into a first intermediate line 34*a* and a second intermediate line 34*b*. First intermediate line 34*a* is coupled to first non-return valve 24*a*. Accordingly, second non-return valve 24*b* is hydraulically connected to first pump 32 via second intermediate line 34*b*. A line 36 leads from first non-return valve 24*a* to junction point 38 in a line 40. First wheel brake cylinder 18*a* is coupled to a first end of line 40. Optionally, it is possible for a pressure sensor 44 to be connected to line 40 via a junction point 42.

Second non-return valve 24*b* may also be connected via a line 46 and a junction point 48 to a line 50, which leads to second wheel brake cylinder 18*b*. As a supplement, another pressure sensor 54 may be connected via a junction point 52.

The brake system may also have a first continuously adjustable valve 56*a* (first continuously controllable/regulatable valve) and/or a second continuously adjustable valve 56*b* (second continuously controllable/regulatable valve). First continuously adjustable valve 56*a* and/or second continuously adjustable valve 56*b* are coupled to brake medium reservoir 12. The first continuously adjustable valve may be connected hydraulically to first wheel brake cylinder 18*a* in such a way that a fifth brake medium volume is transferable through the at least partially open first continuously adjustable valve 56*a* from first wheel brake cylinder 18*a* into brake medium reservoir 12. Advantageously, the second continuously adjustable valve 56*b* is also hydraulically connected to second wheel brake cylinder 18*b* in such a way that a sixth brake medium volume is transferable through the at least partially open second continuously adjustable valve 56*b* from second wheel brake cylinder 18*b* into the brake medium reservoir. There thus exists the possibility of performing a quick return delivery into brake medium reservoir 12 by at least partially opening first continuously adjustable valve 56*a* and/or second continuously adjustable valve 56*b* and to reduce a hydraulic braking torque of the associated wheel brake cylinder 18*a* or 18*b*.

In the specific embodiment represented here, first continuously adjustable valve 56*a* is coupled via a line 58 to a junction point 60 in intake line 30. Furthermore, first continuously adjustable valve 56*a* may be coupled to an end of line 40 facing away from first wheel brake cylinder 18*a*. In this case, one may also speak of an arrangement of first continuously adjustable valve 56*a* in parallel to first pump 22 and first non-return valve 24*a*. Such an arrangement of second continuously adjustable valve 56*b* in parallel to first pump 22 and second non-return valve 24*b* is also realizable in that for example second continuously adjustable valve 56*b* is connected via a line 62 to junction point 60 in intake line 30 and is coupled to an end of line 50 facing away from second wheel brake cylinder 18*b*. The usability of continuously adjustable valves 56*a* and 56*b*, however, is not limited to this possibility of coupling to the brake medium reservoir and/or to the associated wheel brake cylinder 18*a* or 18*b*.

First wheel brake cylinder may be connected to master brake cylinder 10 via a first block valve 64*a* in such a way that by the use of block valve 64*a* it is possible to control a displacement of the first brake medium volume from master brake cylinder 10 into first wheel brake cylinder 18*a*, or a return displacement of the first brake medium volume from first wheel brake cylinder 18*a* into master brake cylinder 10. Via a second block valve 64*b*, second wheel brake cylinder 18*b* may also be connected to master brake cylinder 10. Advantageously, in this case, by using second block valve 64*b* it is possible to control a brake medium displacement between master brake cylinder 10 and second wheel brake cylinder 18*b*. This ensures the advantage that first wheel brake cylinder 18*a* and/or second wheel brake cylinder 18*b* are able to be decoupled from master brake cylinder 10 by the associated block valve 64*a* or 64*b*, and, following a decoupling of first wheel brake cylinder 18*a* and/or second wheel brake cylinder 18*b* from master brake cylinder 10, the first hydraulic braking torque and/or the second hydraulic braking torque are able to be actively set using pump 22, first adjustable valve 56*a* and/or second adjustable valve 56*b*. Such an active setting of the first hydraulic braking torque and/or of the second hydraulic braking torque may occur by taking into account, or independently of, an interior pressure of master brake cylinder 10 and/or an actuation of brake input element 14 on the part of the driver, for example for masking a generator.

For example, first block valve 64*a* may be connected to master brake cylinder 10 via a first supply line 66*a* contacting master brake cylinder 10, a junction point 68 in first supply line 66*a*, and a line 70. A line 72 may lead from first block valve 64*a* to junction point 38 in line 40. Furthermore, a second supply line 66*b* may have a junction point 74, to which second block valve 64*b* is coupled via a line 76. Second block valve 64*b* may be connected to junction point 48 in line 50 by a line 78. The arrangement options of block valves 64*a* and 64b, however, are not limited to the advantageous specific embodiment represented here.

Furthermore, third wheel brake cylinder 28a may be connected to master brake cylinder 10 via first supply line 66a in parallel to first block valve 64a and/or fourth wheel brake cylinder 28b may be connected to master brake cylinder 10 via second supply line 66b in parallel to second block valve 64b. This ensures the advantage that, following a closure of first block valve 64a and/or second block valve 64b, the driver is still able to brake actively at least into third wheel brake cylinder 28a and/or fourth wheel brake cylinder 28b and senses a reaction as a pedal feeling.

For example, first supply line 66a leads from master brake cylinder 10 to a first wheel inlet valve 80a, which is connected to third wheel brake cylinder 28a via a line 82. A first wheel outlet valve 88a may also be connected to third wheel brake cylinder 28a via a junction point 84 in line 82 and a line 86. Third wheel brake cylinder 28a may also have a second pump 90a of the brake system assigned to it, to which first wheel outlet valve 88a is connected via a line 92. Via a junction point 94 in line 92, a first storage chamber 96a may be connected. For quick debraking, it is thus possible to transfer a brake medium volume from third wheel brake cylinder 28a through the at least partially open first wheel outlet valve 88a into first storage chamber 96a. Additionally, using second pump 90a, a brake medium volume may be pumped through a line 100 running between a delivery side of second pump 90a and a junction point 98 in first supply line 66a.

Fourth wheel brake cylinder 28b may also have assigned to it a second wheel inlet valve 80b, a second wheel outlet valve 88b, a third pump 90b and a second storage chamber 96b. A pressure buildup or pressure reduction in third wheel brake cylinder 28a and/or in fourth wheel brake cylinder 28b is thus easy to perform using conventional methods. The coupling of fourth wheel brake cylinder 28b to the master brake cylinder may be developed in accordance with the corresponding coupling of third wheel brake cylinder 28a. For example, fourth wheel brake cylinder 28b may be connected to master brake cylinder 10 via a junction point 102 in second supply line 66b, a line 104 coupled to junction point 102, subsequent second wheel inlet valve 80b and a line 106 connected to it. Another hydraulic connection of fourth wheel brake cylinder 28b to master brake cylinder 10 may include a junction point 108 situated in line 106, a line 110 coupled to junction point 108, subsequent second wheel outlet valve 88b, a line 112 connected to wheel outlet valve 88b, which leads to third pump 90b, and a line 114 running from third pump 90b to a junction point 116 in line 104. Second storage chamber 96b may be connected to fourth wheel brake cylinder 28b via a junction point 118 in line 112. Optionally, another pressure sensor 120 may be connected to second supply line 66b. This construction must also be interpreted merely by way of example.

First pump 22 may be a three-piston pump. In this case, a development of second pump 90a and/or third pump 90b as a single-piston pump is advantageous. It should be noted, however, that other pumps having one or multiple pistons, asymmetric pumps and/or gear pumps may also be used as pumps 22, 90a and 90b. First pump 22, second pump 90a and/or third pump 90b may be situated on a common shaft 122 of a motor 124. This reduces the number of required motors 124.

Block valves 64a and 64b and wheel inlet valves 80a and 80b may be developed as valves that are open when no current is supplied. This allows the driver to brake quickly into associated wheel brake cylinders 18a, 18b, 28a and 28b. In this case it is advantageous to develop the continuously adjustable valves 56a and 56b and wheel outlet valves 88a and 88b as valves that are closed when no current is supplied. It should be noted, however, that the brake system described here is not limited to such a development of valves 56a, 56b, 64a, 64b, 80a, 80b, 88a and 88b.

In one advantageous specific embodiment, the brake system has exactly eight controllable valves, which are controllable/switchable at least into an open state and into a closed state via an electrical signal provided by a control device of the brake system. The limitation of the electrically controllable/switchable valves required by the brake system to the number of eight reduces the requirements and/or the costs for an electronics suited as a control device.

Another advantage of the represented brake system is the joint use of first pump 22 for an increase/active setting of the brake pressure in first wheel brake cylinder 18a and second wheel brake cylinder 18b. In spite of this joint use of pump 22 for the two wheel brake cylinders 18a and 18b, a separate brake circuit is assigned to each wheel brake cylinder 18a and 18b. This is implemented in particular by the two non-return valves 24a and 24b.

First non-return valve 24a may be oriented so as to prevent a brake medium displacement from line 36 to first intermediate line 34a, or from first wheel brake cylinder 18a to a delivery side of first pump 22. Accordingly, an orientation may be preferred for second non-return valve 24b, in which a brake medium flow is prevented from line 46 into second intermediate line 34b, or from second wheel brake cylinder 18b to the delivery side of first pump 22. Such an orientation of non-return valves 24a and 24b may also be called an opposite orientation.

A first brake circuit of first wheel brake cylinder 18a and a second braking circuit of second wheel brake cylinder 18b may be developed as separate brake circuits particularly by using the opposite orientation of the two non-return valves 24a and 24b. An undesired brake medium displacement between the first brake circuit and the second brake circuit, or between lines 36 and 46, is preventable by the opposite orientation of non-return valves 24a and 24b.

The first brake circuit is hydraulically connected to a third brake circuit of third wheel brake cylinder 28a via first block valve 64a. Accordingly, the second brake circuit is hydraulically connected to a fourth brake circuit of fourth wheel brake cylinder 28b via second block valve 64b. Via an appropriate activation of the two block valves 64a and 64b, the first brake circuit and the second brake circuit may thus be connected to or decoupled from the associated third or fourth brake circuit independently from each other. This may also be expressed by saying that, when block valves 64a and 64b are open, the brake system has an X brake circuit configuration. If of the two block valves 64a and 64b respectively one is open and the other is closed, then the brake system has three brake circuits. When block valves 64a and 64b are closed, then the brake system may be described as a brake system having four brake circuits. The brake system described here thus offers a possibility for a structural switch between an X brake circuit configuration, three mutually independent (separated) brake circuits, and four mutually independent (separated) brake circuits.

In the brake system described here, first pump 22 may also be used for an additional volume displacement from brake medium reservoir 12 into third wheel brake cylinder 28a and/or fourth wheel brake cylinder 28b. For this purpose, at least one of block valves 64a and 64b remains open during an operation of first pump 22. In this case, third wheel brake cylinder 28a and/or fourth wheel brake cylinder 28b are also coupled to first pump 22 in such a way that a pressure increase in their interior volume may be produced by first pump 22. Especially in a particularly dynamic braking request, specified for example by an emergency brake system or in an emergency braking situation recognized by the driver, high hydraulic braking torques of wheel brake cylinders 28a and 28b may thus be boosted/built up using first pump 22. For this purpose, first pump 22 may be used as an alternative or as a supplement to the additional pressure buildup using brake booster 16.

In the represented brake system, following a closure of block valves 64a and 64b, an ABS control of first wheel brake cylinder 18a and of second wheel brake cylinder 18b may also be performed using continuously adjustable valves 56a and 56b and first pump 22. An ABS control of third wheel brake cylinder 28a and/or fourth wheel brake cylinder 28b may be performed in a simple manner using the associated valves 80a and 88a or 80b and 88b.

The brake system represented here also has an advantageous safety standard:

Even after the occurrence of a (possibly great) leak in the first or in the second brake circuit, the orientation of non-return valves 24a and 24b ensures a reliable continued use of the other, unaffected brake circuits. There also exists the possibility of directly braking by way of brake booster 16 at least into wheel brake cylinders 28a and 28b even without an actuation of brake input element 14 on the part of the driver, and, if at least one of the two block valves 64a and 64b is in an at least partially open state, of braking also into associated wheel brake cylinder 18a and/or 18b.

Particularly if block valves 64a and 64b are developed as valves that are open when no current is supplied and continuously adjustable valves 56a and 56b are developed as valves that are closed when no current is supplied, following a determination of an electrical fault in the control device and/or in an energy supply of valves 56a, 56b, 64a and 64b, valves 56a, 56b, 64a and 64b may be activated quasi automatically in such a way that a preferred open state of the two block valves 64a and 64b and a preferred closed state of continuously adjustable valves 56a and 56b is ensured. In the process, two mutually separated brake circuits are formed in an X brake circuit configuration, into the wheel brake cylinders 18a, 18b, 28a and 28b of which, the driver continues to be able to brake directly using brake input element 14.

In one advantageous further development, the brake system includes a generator, by which a first generator braking torque may be exerted on first wheel 20a and/or a second generator braking torque may be exerted on second wheel 20b. In order to mask at least one first generator braking torque and/or second generator braking torque increasing over time, it is possible, following a closure of at least one of block valves 64a and 64b, to reduce the internal pressure (brake pressure) in at least one of wheel brake cylinders 18a and 18b, and thus the associated at least one hydraulic braking torque, using at least one of continuously adjustable valves 56a and 56b. For this purpose, continuously adjustable valves 64a and 64b only need to be activated in such a way that a preferred brake medium volume flows back from the associated brake circuits into brake medium reservoir 12.

Due to the closure of the at least one block valve 64a and 64b of the relevant brake circuit, this pressure reduction is not/barely noticeable for the driver. Even after the decoupling of first wheel brake cylinder 18a and second wheel brake cylinder 18b from master brake cylinder 10, the driver still has the option of braking directly into third wheel brake cylinder 28a and into fourth wheel brake cylinder 28b.

Maintaining the pressure only requires as much energy as is required for permanently closing block valves 64a and 64b. The energy consumption may thus be reduced to a minimum. A reduction of the first generator braking torque and/or of the second generator braking torque over time may be compensated by an operation of first pump 22 for delivering a brake medium volume into at least one of wheel brake cylinders 18a and 18b and a corresponding activation of the continuously adjustable valves 56a and 56b.

During the masking process, a driver's braking input/braking intensity input may be detected by a sensor, which may be a subunit of brake booster 16, and is provided as corresponding information to an evaluation device/control device. Taking into account the provided information, the at least one generator braking torque and optionally the third and/or fourth hydraulic braking torque, subsequently a preferred first and/or second hydraulic braking torque is determined by the evaluation device/control device. Subsequently, an internal pressure corresponding to the preferred first and/or second hydraulic braking torque may be set actively in first wheel brake cylinder 18a and/or in second wheel brake cylinder 18b by first pump 22, first continuously adjustable valve 56a and/or second continuously adjustable valve 56b. Such control of first pump 22, of first continuously adjustable valve 56a and/or of second continuously adjustable valve 56b is simple to perform using cost-effective electronics. Particularly the setting of the internal pressure in at least one of wheel brake cylinders 18a and 18b may occur via a pressure setting by delta-p control of continuously adjustable valves 56a and 56b. Alternatively, pressure control using at least one pressure sensor situated in the respective brake circuit is also possible.

As an alternative to the masking processes described above, masking is also possible using the continuously adjustable valves 56a and 56b while block valves 64a and 64b are open. In the process, the hydraulic braking torques of all wheel brake cylinders 18a, 18b, 28a and 28b may be reduced to mask a total generator braking torque increasing over time. The reduction of the hydraulic braking torques of the four wheel brake cylinders 18a, 18b, 28a and 28b in this case may correspond to the increase of the total generator braking torque.

In the event of a reduction of the total generator braking torque over time, a brake medium volume may be pumped from brake medium reservoir 12 into all four wheel brake cylinders 18a, 18b, 28a and 28b using first pump 22. In this manner, the hydraulic braking torques of the four wheel brake cylinders 18a, 18b, 28a and 28b may be increased in such a way that a (nearly) constant vehicle deceleration is maintainable. In order to set the hydraulic braking torques of the four wheel brake cylinders 18a, 18b, 28a and 28b, the continuously adjustable valves 56a and 56b may also be used for delta-p control and/or pressure sensors may be used for pressure regulation.

A controllable/regulatable brake booster 16 additionally offers the advantage of a variable boost force, whereby in the brake system described here, a pedal force perceptible for the driver may be kept constant at least in a lower deceleration range, in particular in a masking process. To illustrate this principle, it is pointed out that an actuating motion of brake input element 14 is normally counteracted by a force (restoring effect), which results from the hydraulic pressure in the brake system, the restoring forces of the springs of master brake cylinder 10 and of brake booster 16 and the boost force of the brake booster.

In the masking of the at least one generator braking torque already described above, the hydraulic pressure in the brake system, and thus the restoring effect, may be modified. Certainly, in the specific embodiment described here, there exists the possibility of minimizing/compensating the change in the restoring effect by a corresponding adaptation of the boost force of brake booster 16, and thus to adapt the force required by the driver for a specific actuation of brake input element 14 to a standard value, which may be keeping it constant. A lack of vacuum availability may also be compensated by an adjustable braking force distribution in all vehicle types.

Particularly advantageous vehicles equipped with the brake system are described below. It should be noted, however, that the usability of the brake system described in the above paragraphs is not limited to vehicles having such equipment:

In a first vehicle (not shown), wheels 20a and 20b are developed as front wheels. As a result of the vehicle being equipped with the brake system, the vehicle has an X brake circuit configuration with a readily decouplable (partially decoupled) front axle. The vehicle may also have a brake booster 16 in the form of an electromechanical brake booster. The additional use of such a brake booster 16 makes it possible quickly to increase the hydraulic braking torques of wheel brake cylinders 18a, 18b, 28a and 28b when required. An increase of the hydraulic braking torques of wheel brake cylinders 18a, 18b, 28a and 28b effected by brake booster 16 may be just as quickly decreased again. Thus, the dynamics of a cost-effective pump 22 may be adapted to the front axle using a quickly regulatable/controllable brake booster 16 of this kind. It should be noted that the vehicle having the arrangement of wheels 20a and 20b on the front axle also has the advantageous safety standard already described above.

As an alternative or as a supplement, a second vehicle may have a generator, by which a first generator braking torque may be exerted on first wheel 20a and a second generator braking torque may be exerted on second wheel 20b. For a particularly advantageous operating strategy, an idle path in brake input element 14 may be designed in such a way that brake input element 14 is "quasi-decoupled" from master brake cylinder 10 in an actuating motion within the idle path. This may be understood to mean that in spite of the actuating motion of brake input element 14 in the direction toward master brake cylinder 10, no pressure is built up in master brake cylinder 10. At the same time, the braking input/braking intensity input of the driver may be detected by a suitable sensor and provided as corresponding information to an evaluation device/control device. In particular, while actuating brake input element 14 along the idle path, a use of brake booster 14 may be omitted.

While actuating brake input element 14 along the idle path, block valves 64a and 64b may be kept in the closed state and/or transferred into the closed state. Using first pump 22, a brake medium volume may thus be displaced quickly from brake medium reservoir 12 into the wheel brake cylinders 18a and lab decoupled from master brake cylinder 10. In this case too, setting a desired brake pressure by a pressure setting using delta-p control of continuously adjustable valves 56a and 56b or by a pressure regulation using at least one pressure sensor situated in a brake circuit is possible.

In particular, while actuating brake input element 14 along the idle path, a generator may also be used to brake recuperatively. In the event of a total generator braking torque increasing over time, the hydraulic braking torques of wheel brake cylinders 18a and 18b decoupled from master brake cylinder 10 may be reduced using the continuously adjustable valves 56a and 56b. This may also be described by saying that the vehicle is overbraked during this phase on wheel brake cylinders 18a and 18b decoupled from master brake cylinder 10, which may be on the front axle.

If a vehicle deceleration is desired that exceeds the total generator braking torque, then at least one hydraulic braking torque may also be built up in wheel brake cylinders 28a and 28b, in particular of the rear axle, coupled directly to master brake cylinder 10. In particular, the increase over time of the hydraulic braking torques of the wheel brake cylinders 28a and 28b of the rear axle, which are coupled directly to master brake cylinder 10, may be greater than the increase over time of the hydraulic braking torques of the wheel brake cylinders 18a and 18b, which are decoupled from master brake cylinder 10. Thus, a reduction of the overbraking of wheel brake cylinders 18a and 18b decoupled from master brake cylinder 10 and a return to a uniform braking force distribution on all wheels 20a, 20b, 26a and 26b is readily implementable. A masking of the total generator braking torque by the built-up hydraulic braking torques is still possible even during this phase.

In particular, it is advantageous if block valves 64a and 64b are opened at the moment of pressure equality in the brake circuits decoupled from master brake cylinder 10 and the brake circuits coupled directly to master brake cylinder 10. If recuperative braking is performed by the generator at the moment of the expected pressure equality, then the total generator braking torque may be withdrawn. Accordingly, the hydraulic braking torques may be increased. This makes it easier to open block valves 64a and 64b. From this time onward, an additional pressure buildup preferably may occur only in combination with an actuation of the brake input element on the part of the driver and its support by brake booster 16. Even if from this deceleration level onward no more masking is performed, the operating time of the first pump may be clearly reduced with the help of this operating strategy.

In the second vehicle there also exists the possibility of a particularly quick/dynamic increase of the vehicle deceleration, in that a brake pressure is built up in all four wheel brake cylinders 18a, 18b, 28a and 28b using brake booster 16 and/or using first pump 22. Following an opening of block valves 64a and 64b, which may be performed quickly, first pump 22 may be used to deliver a brake medium volume into all four wheel brake cylinders 18a, 18b, 28a and 28b, which may be in conjunction with brake booster 16.

In another implementable operating strategy, following a closure of block valves 64a and 64b, which may be for decoupling the front axle, at least one preferable hydraulic braking torque of decoupled wheel brake cylinders 18a and 18b, which is in particular suitable for masking, is built up using first pump 22 and continuously adjustable valves 56a and 56b. Additionally, the driver is able to brake directly into the two wheel brake cylinders 28a and 28b, which are directly hydraulically connected to master brake cylinder 10.

Figure 2:
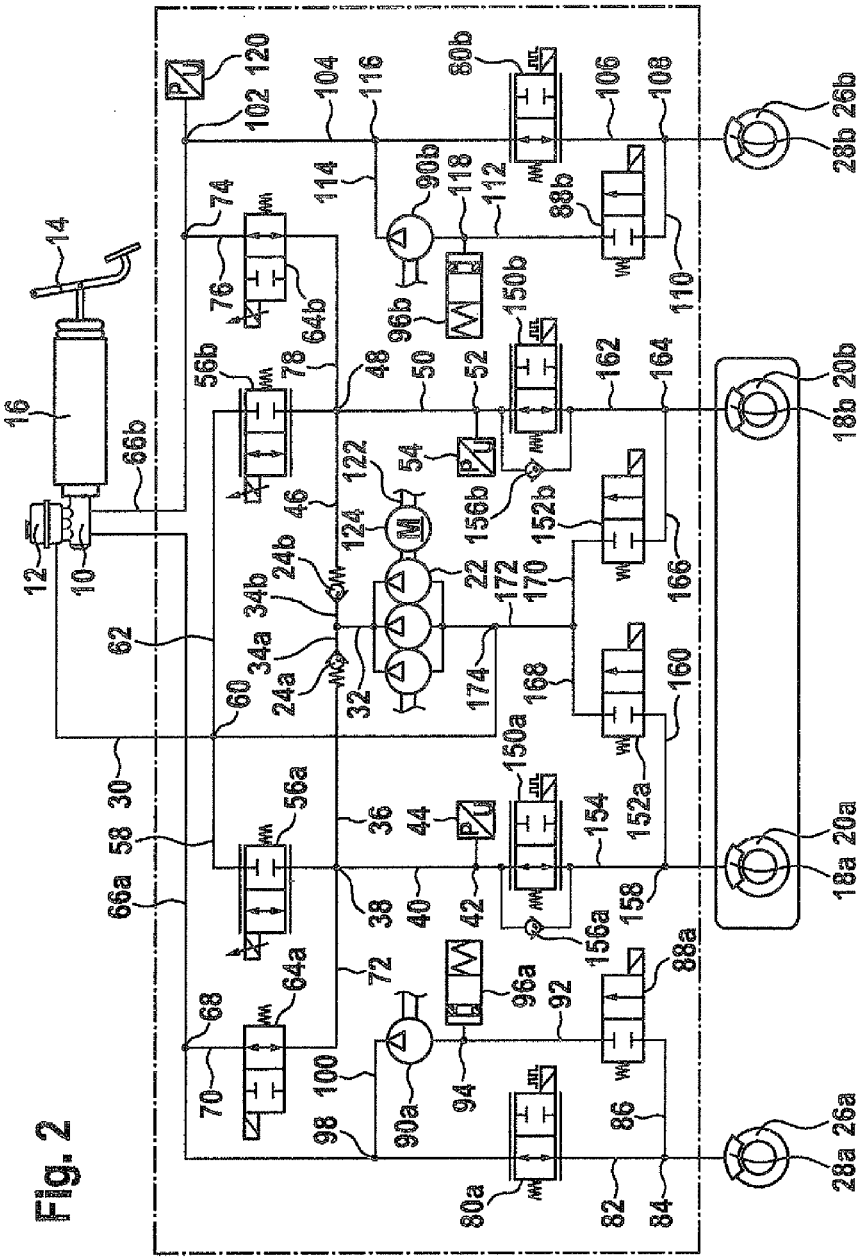
FIG. 2 shows a circuit diagram of a second specific embodiment of the brake system.

FIG. 2 shows a circuit diagram of a second specific embodiment of the brake system.

The brake system illustrated schematically in FIG. 2 features the already mentioned components 10 through 124. As a supplement, the two wheel brake cylinders 18a and 18b decouplable from master brake cylinder 10 respectively have assigned to them one wheel inlet valve 150a or 150b and one wheel outlet valve 152a or 152b.

First wheel brake cylinder 18a, for example, may be connected via a line 154 to a third wheel inlet valve 150a, which is situated on an end of line 40 opposite first continuously adjustable valve 56a. Parallel to third wheel inlet valve 150a, a bypass line may run having a non-return valve 156a, which is oriented so that non-return valve 156a prevents a brake medium displacement through the bypass line from line 40 to line 154. First wheel brake cylinder 18a may also be connected to a third wheel outlet valve 152a via a junction point 158 in line 154 and a line 160 coupled to junction point 158.

A fourth wheel inlet valve 150b and a parallel bypass line having a non-return valve 156b may be connected to second wheel brake cylinder 18b via a line 162. Regarding the orientation of non-return valve 156b, reference is made to the above example. Accordingly, a fourth wheel outlet valve 152b is connected to second wheel brake cylinder 18b via a line 166, which opens out into a junction point 164 in line 162. Wheel outlet valves 152a and 152b may be connected via respectively one line 168 or 170 to an end of a line 172 opposite first pump 22, which has a junction point 174, into which intake line 30 opens out.

The additional equipment of the brake system with wheel inlet valves 150a and 150b and wheel outlet valves 152a and 152b ensures a complete debraking of associated wheel brake cylinders 18a and 18b while first pump 22 is running. Thus, each wheel brake cylinder 18a and 18b may be decoupled from first pump 22. This ensures additional possibilities for a wheel-specific setting of the hydraulic braking torques of first wheel brake cylinder 18a and second wheel brake cylinder 18b.

The method for operating a brake system of a vehicle may also be implemented by the brake systems of FIGS. 1 and 2. The feasibility of the method, however, is not limited to these brake systems. Instead, a brake system having a master brake cylinder, a brake medium reservoir, a first wheel brake cylinder hydraulically connected to the master brake cylinder, a second wheel brake cylinder hydraulically connected to the master brake cylinder and a pump hydraulically connected to the brake medium reservoir may be used for the method, the first wheel brake cylinder being hydraulically connected to the pump via a first non-return valve and the second wheel brake cylinder being hydraulically connected to the pump via a second non-return valve.

The method includes the method step of an active buildup or increase of a first hydraulic braking torque, which is exerted by first wheel brake cylinder on a first wheel of the vehicle, and/or of a second hydraulic braking torque, which is exerted by the second wheel brake cylinder on a second wheel of the vehicle. For this purpose, the pump is operated in such a way that a first brake medium volume is pumped from the brake medium reservoir through the first non-return valve into the first wheel brake cylinder and/or a second brake medium volume is pumped from the brake medium reservoir through the second non-return valve into the second wheel brake cylinder.

The method is also expandable by the method steps described above, in particular by the masking steps, the restoring effect-adaptation steps and the emergency braking steps. A repetition of these method steps is omitted on account of the detailed description already provided above.

What is claimed is:

1. A brake system for a vehicle, comprising:
a master brake cylinder;
a brake medium reservoir;
a first wheel brake cylinder, which is hydraulically connected to the master brake cylinder so that a first brake medium volume is displaceable from the master brake cylinder into the first wheel brake cylinder;
a second wheel brake cylinder, which is hydraulically connected to the master brake cylinder so that a second brake medium volume is displaceable from the master brake cylinder into the second wheel brake cylinder;
a pump, which is hydraulically connected to the brake medium reservoir, wherein:
the first wheel brake cylinder is hydraulically connected to a delivery output of the pump via a first non-return valve so that by using the pump, a third brake medium volume may be pumped from the brake medium reservoir through the first non-return valve into the first wheel-brake cylinder; and
the second wheel brake cylinder is hydraulically connected to the same delivery output of the pump via a second non-return valve so that by using the pump, a fourth brake medium volume is pumpable from the brake medium reservoir through the second non-return valve into the second wheel-brake cylinder,
a first continuously adjustable valve, which is coupled to the brake medium reservoir and hydraulically connected to the first wheel brake cylinder so that a fifth brake medium volume is transferable through the first continuously adjustable valve from the first wheel brake cylinder into the brake medium reservoir when the first continuously adjustable valve is at least partially open; and
a block valve directly connected on one side to the master brake cylinder via a supply line and directly connected on an opposite side to a junction point where the delivery output of the pump meets the first continuously adjustable valve.

2. The brake system of claim 1, wherein the first non-return valve and the second non-return valve are oriented in opposite directions at a junction point where the delivery output of the pump is split into separate circuits respectively connected to the first wheel brake cylinder and the second wheel brake cylinder, such that the first non-return valve prevents a brake medium displacement from the first wheel brake cylinder to a delivery side of the pump, while the second non-return valve prevents a brake medium displacement from the second wheel brake cylinder to the delivery side of the pump.

3. The brake system of claim 1, further comprising:
a second continuously adjustable valve, which is coupled to the brake medium reservoir, wherein the second wheel brake cylinder is hydraulically connected to the second continuously adjustable valve so that a sixth brake medium volume is transferable through the second continuously adjustable valve from the second wheel brake cylinder into the brake medium reservoir when the second continuously adjustable valve is at least partially open.

4. The brake system of claim 1, wherein a third wheel brake cylinder is hydraulically connected to the master brake cylinder via the supply line in parallel to the block valve.

5. The brake system of claim 1, further comprising:
a generator, by which at least one of a first generator braking torque is exertable on a first wheel associated with the first wheel brake cylinder and a second generator braking torque is exertable on a second wheel associated with the second wheel brake cylinder.

6. The brake system of claim 1, wherein there are exactly eight controllable valves, which are controllable at least into an open state and into a closed state via an electrical signal provided by a control device of the brake system.

7. The brake system of claim 1, wherein
the vehicle includes an electromechanical brake booster; and
the brake system includes a generator, by which at least one of a first generator braking torque is exertable on a first front wheel associated with the first wheel brake cylinder and a second generator braking torque is exertable on a second front wheel associated with the second wheel brake cylinder.

8. The brake system of claim 7, wherein the first non-return valve and the second non-return valve are oriented in opposite directions at a junction point where the delivery output of the pump is split into separate circuits respectively connected to the first wheel brake cylinder and the second wheel brake cylinder.

9. The brake system of claim 1, wherein:
the first wheel brake cylinder is hydraulically connected to the master brake cylinder via the block valve so that a displacement of the first brake medium volume from the master brake cylinder into the first wheel brake cylinder is controllable with the aid of the block valve;
a third wheel brake cylinder is hydraulically connected to the supply line via a junction point that lies between the master brake cylinder and the block valve; and
the third wheel brake cylinder remains hydraulically connected to the master brake cylinder when the block valve is closed.

10. The brake system of claim 1, wherein a delivery side of the pump is connected to a brake cylinder side of the first continuously adjustable valve.

11. The brake system of claim 1, wherein a downstream side of the first continuously adjustable valve is connected to a wheel brake and to a delivery side of the pump, and wherein an upstream side of the first continuously adjustable valve is connected to a suction side of the pump.

12. A method for operating a brake system of a vehicle, the brake system including a master brake cylinder, a brake medium reservoir, a first wheel brake cylinder hydraulically connected to the master brake cylinder, a second wheel brake cylinder hydraulically connected to the master brake cylinder and a pump hydraulically connected to the brake medium reservoir, the first wheel brake cylinder being hydraulically connected to a delivery output of the pump via a first non-return valve and the second wheel brake cylinder being hydraulically connected to the same delivery output of the pump via a second non-return valve, the method comprising:
providing active buildup/increase of at least one of a first hydraulic braking torque, which is exerted by the first wheel brake cylinder on a first wheel of the vehicle, and a second hydraulic braking torque, which is exerted by the second wheel brake cylinder on a second wheel of the vehicle, by operating the pump so that at least one of a first brake medium volume is pumped from the brake medium reservoir through the first non-return valve into the first wheel brake cylinder and a second brake medium volume is pumped from the brake medium reservoir through the second non-return valve into the second wheel brake cylinder;
wherein:
a first continuously adjustable valve is coupled to the brake medium reservoir and hydraulically connected to the first wheel brake cylinder so that a fifth brake medium volume is transferable through the first continuously adjustable valve from the first wheel brake cylinder into the brake medium reservoir when the first continuously adjustable valve is at least partially open; and
a block valve is directly connected on one side to the master brake cylinder via a supply line and directly connected on an opposite side to a junction point where the delivery output of the pump meets the first continuously adjustable valve.

13. The method of claim 12, wherein:
the first wheel brake cylinder is hydraulically connected to the master brake cylinder via the block valve so that a displacement of the first brake medium volume from the master brake cylinder into the first wheel brake cylinder is controllable with the aid of the block valve;
a third wheel brake cylinder is hydraulically connected to the supply line via a junction point that lies between the master brake cylinder and the block valve;
the third wheel brake cylinder remains hydraulically connected to the master brake cylinder when the block valve is closed; and
the method further comprises:
closing the block valve during active braking by a driver of the vehicle; and
building up the first hydraulic braking torque and the second hydraulic braking torque separately from any hydraulic braking torque directly set by the driver's active braking.

14. The method of claim 12, wherein the first non-return valve and the second non-return valve are oriented in opposite directions at a junction point where the delivery output of the pump is split into separate circuits respectively connected to the first wheel brake cylinder and the second wheel brake cylinder.

15. A brake system for a vehicle, comprising:
a master brake cylinder;
a brake medium reservoir;
a first wheel brake cylinder, which is hydraulically connected to the master brake cylinder so that a first brake medium volume is displaceable from the master brake cylinder into the first wheel brake cylinder;
a second wheel brake cylinder, which is hydraulically connected to the master brake cylinder so that a second brake medium volume is displaceable from the master brake cylinder into the second wheel brake cylinder;
a pump, which is hydraulically connected to the brake medium reservoir, wherein:
the first wheel brake cylinder is hydraulically connected to a delivery output of the pump via a first non-return valve so that by using the pump, a third brake medium volume may be pumped from the brake medium reservoir through the first non-return valve into the first wheel-brake cylinder; and
the second wheel brake cylinder is hydraulically connected to the same delivery output of the pump via a second non-return valve so that by using the pump, a fourth brake medium volume is pumpable from the brake medium reservoir through the second non-return valve into the second wheel-brake cylinder; and
a first continuously adjustable valve, which is coupled to the brake medium reservoir and hydraulically connected to the first wheel brake cylinder so that a fifth brake medium volume is transferable through the first continuously adjustable valve from the first wheel brake cylinder into the brake medium reservoir when the first continuously adjustable valve is at least partially open, wherein a downstream side of the first continuously adjustable valve is connected to a wheel brake and to a delivery side of the pump, and an upstream side of the first continuously adjustable valve is connected to a suction side of the pump.

* * * * *